(12) United States Patent
Stefan

(10) Patent No.: US 6,578,800 B2
(45) Date of Patent: Jun. 17, 2003

(54) APPARATUS FOR FIXING A CABLE GUIDANCE HOSE

(75) Inventor: Karlinger Stefan, Augsburg (DE)

(73) Assignee: Kuka Roboter GmbH (DE)

( * ) Notice: Subject to any disclaimer, the term of this patent is extended or adjusted under 35 U.S.C. 154(b) by 0 days.

(21) Appl. No.: 09/878,260

(22) Filed: Jun. 11, 2001

(65) Prior Publication Data

US 2001/0052564 A1 Dec. 20, 2001

(30) Foreign Application Priority Data

Jun. 15, 2000 (DE) .......................... 200 10 696
Aug. 24, 2000 (DE) .......................... 200 14 649

(51) Int. Cl.[7] ............................................. F16L 3/00
(52) U.S. Cl. .............................................. 248/52; 248/73
(58) Field of Search .......................... 248/52, 51, 53, 248/56, 57, 73, 65, 74.4; 174/77 R, 93, 151

(56) References Cited

U.S. PATENT DOCUMENTS

| | | | | |
|---|---|---|---|---|
| 3,803,531 A | * | 4/1974 | Sorensen | 439/190 |
| 5,132,493 A | * | 7/1992 | Sheehan | 174/65 R |
| 5,170,017 A | * | 12/1992 | Stanevich et al. | 174/153 G |
| 5,406,032 A | * | 4/1995 | Clayton et al. | 174/151 |
| 5,442,140 A | * | 8/1995 | Mc Grane | 174/151 |
| 5,561,273 A | * | 10/1996 | Yamanashi | 174/152 R |
| 5,831,217 A | * | 11/1998 | Jarvis et al. | 174/153 R |
| 6,335,488 B1 | * | 1/2002 | Gretz | 174/65 R |

* cited by examiner

*Primary Examiner*—Leslie A. Braun
*Assistant Examiner*—A. Joseph Wujciak, III
(74) *Attorney, Agent, or Firm*—McGlew and Tuttle, P.C

(57) ABSTRACT

The invention relates to an apparatus for fixing a cable guidance hose to a device, such as in particular a robot.

Figure 1:
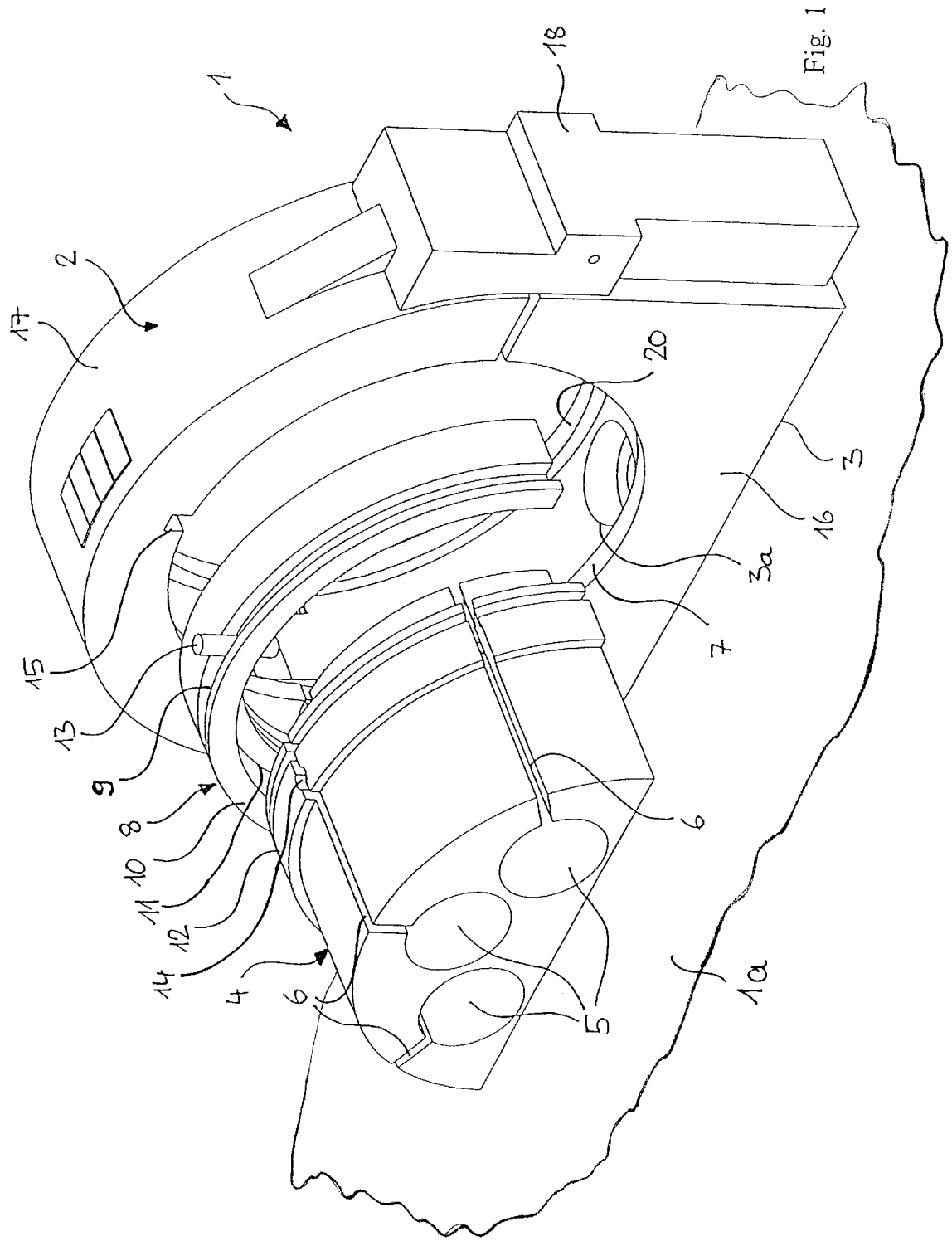

In order to ensure an optimum, damage-free fixing of a cable guidance hose and in particular the cables guided therein, the cable guidance hose (19) is held in axially fixed manner and at least one holding part (8, 21) connected thereto is held in axially fixed, non-rotary manner on the device (R).

25 Claims, 10 Drawing Sheets

APPARATUS FOR FIXING A CABLE GUIDANCE HOSE

The invention relates to an apparatus for fixing a cable guidance hose to a device, such as in particular a robot.

Such cable guidance or protective hoses are mainly used on robots having several parts pivotable relative to one another, particularly robot arms, in order to guide externally of the robot electrical cables for the power supply of the robot or a tool located in a robot hand. As distance or spacing changes between individual points of the robot occur during operation, the cable guidance hoses must on the one hand be able to absorb length changes and on the other must be loaded to the minimum during robot movements in order to ensure a high level of stability and prevent untimely failure.

At the end of the cable guidance hose the cables guided therein must be held so as not to rotate and also axially fixed to prevent cable damage by sliding, twisting and extraction from the cable guidance hose and so as to ensure an adequate tension relief of the cables and an adequate relief of the connections for the cables to the robot or tool. However, the cable guidance hose must also be axially fixed, but must be rotatable about its median longitudinal axis on the robot in order to avoid twisting as a result of robot movements during operation.

It is known to fix the cables in bundle form by clamping to the robot in axially fixed and non-rotary manner and to separately mount on the robot in rotary manner about its median longitudinal axis said cable guidance hose. It is disadvantageous that two different bearing parts are required, which is both complicated and costly and also a relatively large amount of space is needed, which is only available to a limited extent particularly in the vicinity of the highly mobile robot hand generally pivotable about several axes. It is also known to fix both the cable guidance hose and the cables together to the robot so as to rotate about the median longitudinal axis of the hose, which for the indicated reasons can lead to cable damage.

The problem of the invention is to propose an inexpensive, space-saving apparatus of the aforementioned type, which in particular takes account of the indicated requirements with respect to the damage-fixing of a cable guidance hose and the cables located therein to a mechanical device, such as in particular a robot.

In the case of an apparatus of the aforementioned type, the invention solves this problem in that the cable guidance hose is held in axially fixed manner and at least one holding part connected thereto is held in axially fixed and non-rotary manner on the device.

Thus, the cable guidance hose is held in axially fixed and further holding parts are held in non-rotary and axially fixed manner to the device, such as the robot.

In preferred developments it is provided that the holding part is held in non-rotary manner in the clip and in particular that the holding part receives a cable clamping piece holding in non-positive manner the cables in the cable guidance hose. Here there is a clip for the axially fixed securing and a cable clamping piece holding positively the cables and also one end of the cable guidance hose and between the cable clamping piece and the clip is provided a non-rotary connection, whereas the connection between the cable guidance hose and the clip in particular permits relative mutual rotation.

The apparatus according to the invention permits a compact and easily fittable and dismantlable arrangement of the cables together with the cable guidance hose and a relative rotatability of the cable clamping piece receiving in positive manner the cables with respect to the cable guidance hose is ensured, in that the cable clamping piece is held in non-rotary axially fixed manner in the clip, whilst the cable guidance hose end is mounted in axially fixed, but rotary manner in the same clip. It is particularly suitable for fixing the cable guide of a robot in the vicinity of the robot hand, in that the clip is so positioned in the area of the robot hand that the cables used e.g. for the power supply of a robot tool are fixed by means of the cable clamping piece on the side facing the robot hand and the cable guidance hose on the side remote from the robot hand in said clip.

In a preferred construction the clip is provided on the inside with at least one holding profile for the axially positive fixing of a holding part for the cable guidance hose and a holding part for the cable clamping piece with in each case a profile complimentary to the holding profile of the clip. The holding profiles of the clip in particular have an adequate axial spacing to ensure that there is a gap between the facing end faces of the cable guidance hose and the cable clamping piece, so as not to impair the relative rotatability of the cable guidance hose with respect to the cable clamping piece.

In order to ensure a rapid and easy installation, the holding part for the cable guidance hose preferably has two half-rings, which are equipped on the inside with a holding structure for the axially positive fixing on the cable guidance hose circumference. If the cable guidance hose at least terminally in cross-section has a corrugation, particularly a rectangular or trapezoidal corrugation, the holding structure of the holding rings for the cable guidance hose has in preferred manner a holding structure engaging in the corrugated structure of the cable guidance hose. Alternatively the holding structure of the holding rings can e.g. be constructed for the reception of a circumferential bead or the like shaped at the cable guidance hose end.

In accordance with the construction of the holding part for the cable guidance hose, in a preferred construction also the holding part for the cable clamping piece has two half-rings, which are equipped on their inside with a holding structure for the axially positive fixing to a fixing structure located in complimentary manner thereto on the circumference of the cable clamping piece.

For the non-rotary fixing of the cable clamping piece in the clip preferably at least one half-ring of the holding part for the cable clamping piece can be secured in non-rotary manner by means of a pin traversing the same both to the cable clamping piece and to the clip and in particular on the end face of the clip facing the cable clamping piece is provided a groove for receiving one end of the pin and on the cable clamping piece circumference in the vicinity of the fixing structure a recess for receiving the other end of the pin.

In order to ensure increased protection of the cables against abrasion through the rotating hose, according to a further development the cable clamping piece has a spigot engaging in the cable guidance hose and which covers the connection point between the cable clamping piece and the cable guidance hose on the inside thereof.

In order to ensure an easy equipping of the cable clamping piece with the cables, the cable clamping piece is preferably constructed in the manner of a clamp with several axially positioned holding channels for the non-positive securing of the cables and is in particular made from an elastic material, said holding channels being connected by means of slots to the clamping piece circumference. In this way the cables can be easily introduced by means of the slots into the holding channels and, if cables have to be replaced, can be removed from said channels.

In order to ensure a non-positive connection between the cables and the cable clamping piece, preferably a tension clip engaging round the clamping piece on its side remote from the clip is provided and the tension thereof is in particular variable, so that cables with different diameters can be fixed in the cable clamping piece.

As indicated, the clip can in particular be secured to part of the robot, particularly in the vicinity of the robot hand, by random holding means, such as screws, bolts, clasps, etc.

In a highly preferred development of the invention, a holding part has a sleeve with a spherical segment outer face and with respect to the clip median longitudinal axis the sleeve is held in both rotary and pivotable manner thereon. This ensures a maximum protection of the cable guidance hose even against bending and torsional moments acting thereon.

This preferred development of the holding of the cable guidance hose in the manner of a ball bearing ensures in addition to a free rotatability of said hose with respect to the clip, a pivotability thereof with respect to the median longitudinal axis of the clip. Thus, the cable guidance hose is effectively relieved, in that it is protected against torsional and bending stresses, which leads to an increased service life and makes possible certain applications for the first time. Thus, the apparatus according to the invention is particularly suitable for fixing the cable guide of a robot in the vicinity of the robot hand, in that the clip is so positioned in the vicinity of said hand that the cables e.g. used for the power supply of a robot tool can be fixed by a cable clamping piece to the side facing the robot hand and the cable guidance hose on the side remote from the robot hand in rotary and pivotable manner in the clip. Whereas the cable guidance hose is preferably held in freely rotary manner on the clip, it is preferably pivotable by approximately 30°, particularly approximately 20° in each direction relative to the clip median longitudinal axis.

In order to ensure a simple and rapid installation, the sleeve preferably has two half-shells, which are equipped on their inside with shapes for the axially positive securing to the circumference of the cable guidance hose. If the cable guidance hose at least terminally has in cross-section a corrugation, particularly a rectangular or trapezoidal corrugation, the shapes of the half-shells of the sleeve preferably engage in the corrugation of the cable guidance hose. Alternatively the shapes of the sleeve are e.g. constructed for receiving a circumferential bead or the like formed on the cable guidance hose end.

Whilst the sleeve can fundamentally be directly secured to an inner profile of the clip complimentary to its spherical segment, in a preferred construction the holding part also has a ring bearing receiving the sleeve with an inner face complimentary to the spherical segment outer face of the sleeve and in particular the ring bearing is provided on its side remote from the sleeve with a holding profile for securing on the clip. Thus, the cable guidance hose can be more easily fitted and it is also possible to use a conventional, simple, inexpensive clip.

The holding profile of the ring bearing can either be fixed to a profile of the clip complimentary thereto, or it can be fixed to an adaptor ring profile complimentary thereto and which has on its side remote from the ring bearing a fixing profile for fixing on a clip profile complimentary thereto. The latter variant more particularly permits a space-saving arrangement of the cable guidance hose if the adaptor ring has on its side facing the ring bearing a larger diameter than on its side remote therefrom or facing the clip, so that the clip diameter can roughly correspond to the hose diameter.

For purposes of a simple, rapid installation, the adaptor ring preferably has two half-rings.

Appropriately on its holding profile the ring bearing can either be fixed directly or via the adaptor ring in axially fixed manner to the clip.

As stated, in a preferred construction on the clip side remote from the cable guidance hose can be secured in axially fixed and non-rotary manner a cable clamping piece non-positively holding the cables. Thus, the clip is provided both for the axially fixed holding of the cable clamping piece and also one end of the cable guidance hose and between the clamping piece and the clip there is a non-rotary connection, whilst the connection between the cable guidance hose and the clip remains pivotable and rotatable relative to one another. The non-rotary connection the clip and the cable clamping piece can e.g. be ensured by complimentary polyhedral profiles, by holding pins or random known means.

The clip is preferably a tension clip with a base fixable to the machine by random holding means, such as screws, bolts, clasps, etc. and a top braceable and articulated thereto by means of a shackle. In this way the ring bearing of the holding part or the adaptor ring is firmly clamped in the tension clip and is preferably held in non-rotary manner by frictional forces.

The invention also relates to a mechanical device, such as in particular a robot with at least partly externally positioned cables, especially supply cables of robot tools and which is equipped with an apparatus of the aforementioned type.

The invention is described in greater detail hereinafter relative to preferred embodiments and the attached drawings, wherein show:

FIG. 1 A perspective view of an embodiment of an apparatus for fixing cables of a cable guidance hose in an exploded representation.

Figure 2:
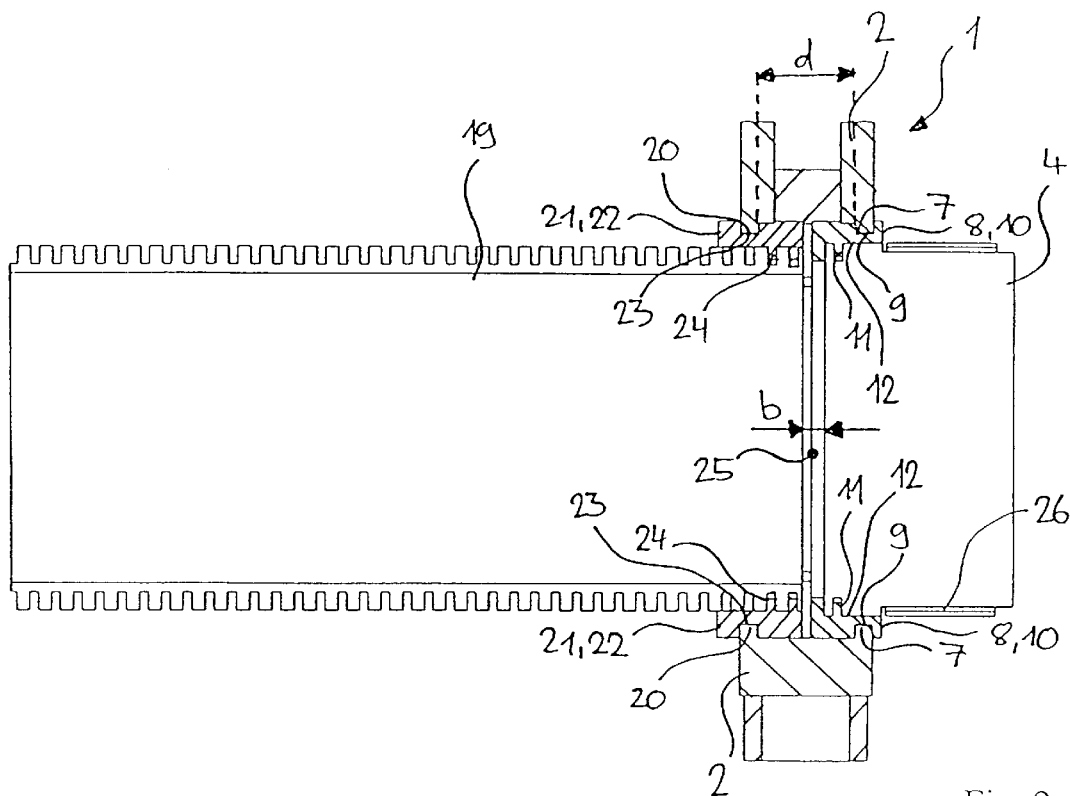

FIG. 2 A cross-section through the apparatus according to FIG. 1 fitted to a cable guidance hose.

Figure 3:
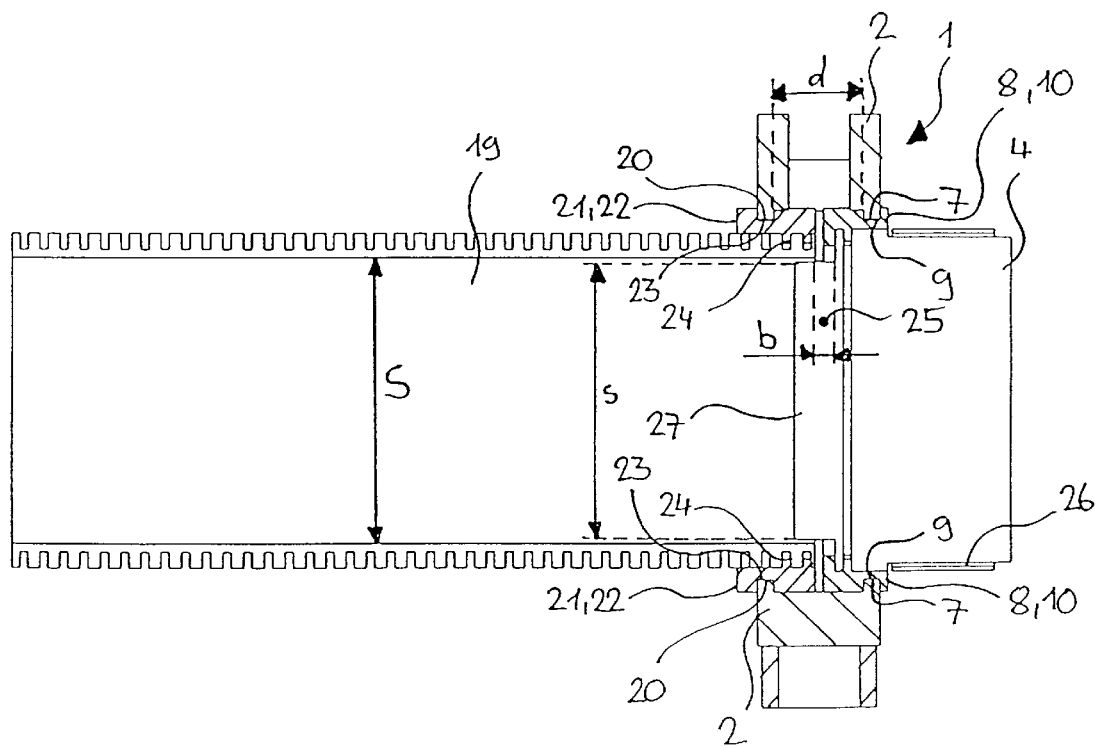

FIG. 3 A cross-section through an alternative embodiment fitted to a cable guidance hose.

FIGS. 4 to 7 Various installation situations during the fitting of the apparatus according to FIGS. 1 and 2 to a cable guidance hose.

Figure 8:
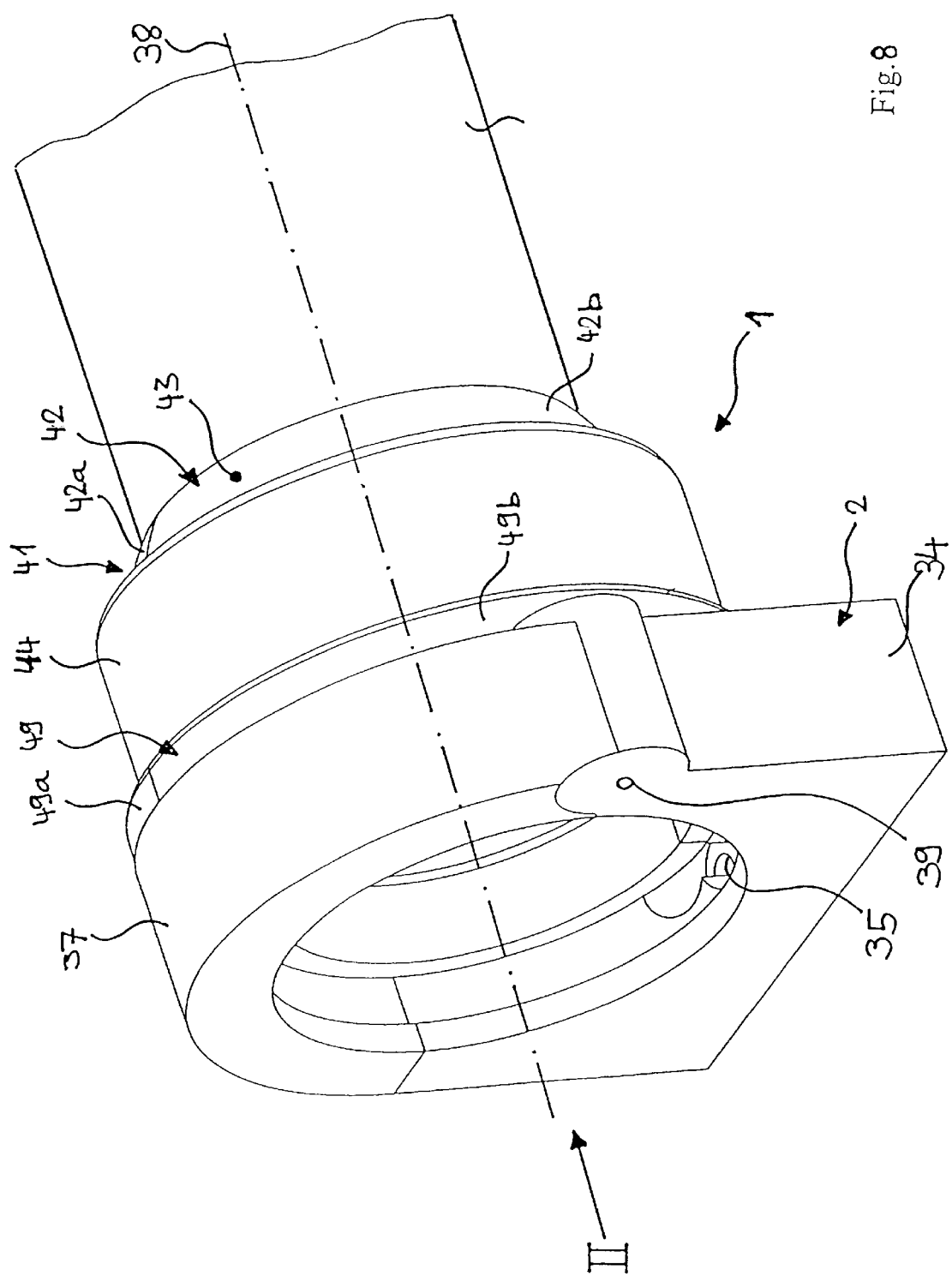

FIG. 8 A perspective view of an embodiment of an apparatus for fixing a cable guidance hose.

Figure 9:
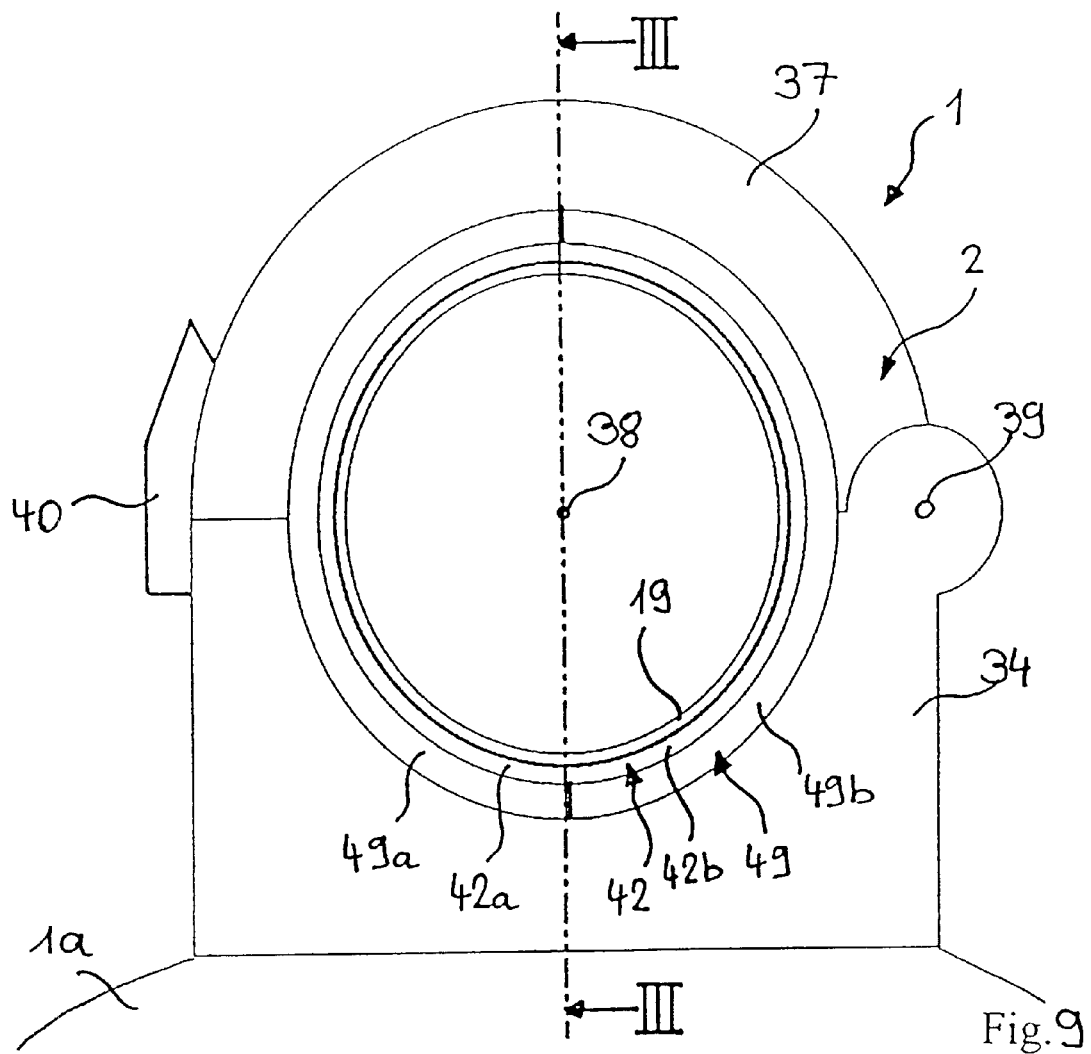

FIG. 9 A plan view of the apparatus according to FIG. 8 in the direction of arrow II.

Figure 10:
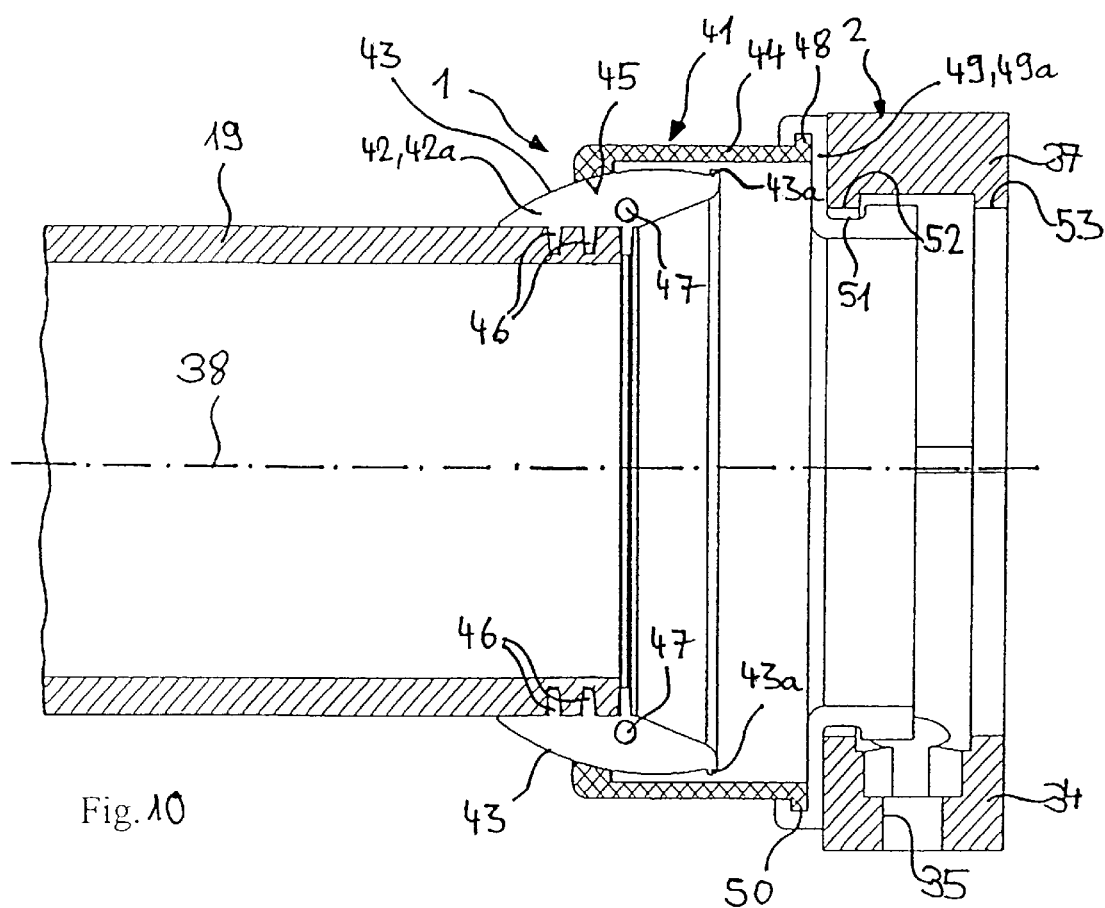

FIG. 10 A longitudinal section III—III through the apparatus of FIG. 9.

FIG. 11 A perspective view of the apparatus according to FIGS. 8 to 10 for illustrating the pivotability of the cable guidance hose.

FIGS. 12 to 19 Different installation situations during the fitting of the apparatus according to FIGS. 8 to 11 to a cable guidance hose.

Figure 5:
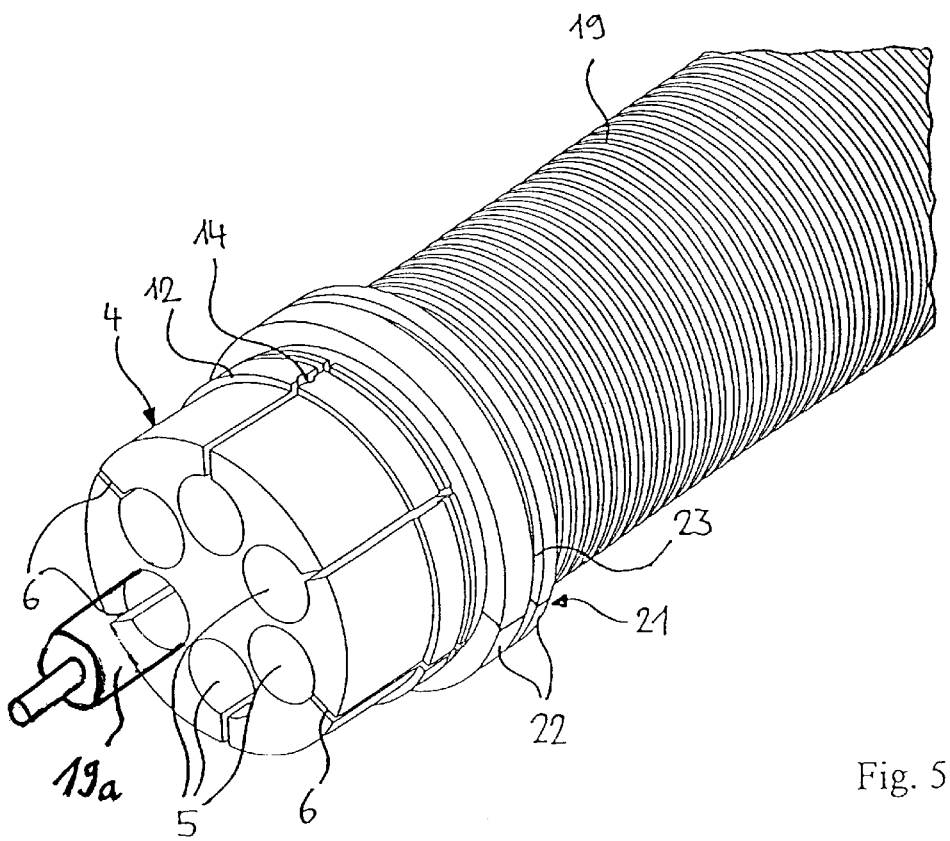

The apparatus 1 shown in FIG. 1 comprises a clamping clip 2, which can e.g. be fixed on its planar underside 3 by means of a bore 3a in the vicinity of a robot hand of a robot 1a and is used for the fixing of cables 19a (whereof only one is shown in FIG. 5) for the power supply of tools of robot 1a. For the positive holding of the cables the apparatus 1 also has a cable clamping piece 4 made from an elastic material, e.g. plastic shown sectioned in the longitudinal direction in FIG. 1. The cable clamping piece 4 is constructed in the manner of a clamp with several holding channels 5 axially traversing the same for the non-positive securing of the cables and the holding channels 5 are connected by slots 6 to the circumference of the cable clamping piece 4, in order to allow the holding channels 5 to be equipped in simple manner with cables by means of the slots 6.

For the axial securing of the cable clamping piece in the clamping clip 2, the latter has on its inside facing the clamping piece 4 a holding profile 7, on which can be positively fixed a holding part 8 with a profile 9 complimentary to the holding profile 7 of the clamping clip 2. In the embodiment shown the holding part 8 for the cable clamping piece 4 has two half-rings 10, whereof the upper one is shown in exemplified manner. In the construction shown the holding profile 7 of the clamping clip 2 is formed by a projection located on the inner circumference of said clip 2, whilst the profile of the half-rings 10 complimentary to the holding profile 7 has an outside circumferential groove. The half-rings 10 of the holding part 8 for the cable clamping piece 4 are equipped on their inside with a holding structure 11 for the axial positive fixing to a fixing structure 12 arranged on the circumference of the cable clamping piece 4 facing the clip 2 and complimentary thereto.

In order to fix the cable clamping piece 4 in non-rotary manner in the clamping clip 2, there is a pin 13 radially traversing the half-ring 10 of the holding part 8 and whose one end can be introduced into a recess 14 on the circumference of the cable clamping piece 4 in the vicinity of the fixing structure 12 and whose other end can be introduced into a groove 15 provided on the end face of the clip 2 facing the clamping piece 4. In per se known manner the clamping clip 2 comprises a base 16 more particularly fixable to a robot and a top 17 braceable by means of a shackle 18 and articulated thereto.

As can in particular be gathered from FIG. 2, for the axially fixed securing of a cable guidance hose 19 on its inside remote from the cable clamping piece 4, the clamping clip 2 has a further holding profile 20 which, in accordance with the holding profile 7, for fixing the holding part 8 for the cable clamping piece 4 is formed by a projection on the inner circumference of the clip 2. The holding profile 20 is used for the positive securing of a holding part 21 for the cable guidance hose 19, which in accordance with the holding part 8 for the cable clamping piece 4 comprises two half-rings 22 and is equipped on its outer circumference with a profile 23 in the form of an outside circumferential groove complimentary to the holding profile 20 of the clamping clip 2. On the inside of the half-rings 22 of the holding part 21, the latter has a holding structure 24 for the axial, positive fixing to the circumference of the cable guidance hose 19, which in the construction shown is cross-sectionally corrugated in rectangular or trapezoidal manner, so that the holding structure 24 engages in the corrugated structure of the guidance hose 19. In this way the hose 19 is mounted in axially fixed, but rotary manner in the clamping clip 2, whilst the cable clamping piece 4 is fixed in both axially fixed and by means of the pin 13 (FIG. 1) in non-rotary manner in the clip 2. In order not to impair the relative rotatability of the cable guidance hose 19 with respect to the cable clamping piece 4 as a result of friction, the axial spacing d of the holding profile 7, 20 of the clamping clip 2 is selected in such a way that between the facing end faces of the guidance hose 19 and clamping piece 4 is formed a gap 25 of width b.

For the non-positive securing of the not shown cables in the holding channels 5 (FIG. 1) of the cable clamping piece 4, there is also a tension clip 26 embracing the clamping piece 4 on its circumference remote from the clamping clip 2 and the tension thereof is in particular variable so as to compensate diameter tolerances of the cables inserted.

The embodiment shown in FIG. 3 differs from that in FIG. 2 in that the cable clamping piece 4 has a spigot 27 engaging in the cable guidance hose 19 and which protects the cables against mechanical damage, in that it covers on the inside the gap 25 between the cable guidance hose 19 and the clamping piece. In order not to impair by friction the relative rotatability of the cable guidance hose 19 with respect to the cable clamping piece 4, the external diameter s of the spigot is smaller than the internal diameter S of the guidance hose.

Hereinafter, with reference to FIGS. 4 to 7, the installation of an apparatus according to the invention on a cable guidance or protective hose is explained.

Figure 4:
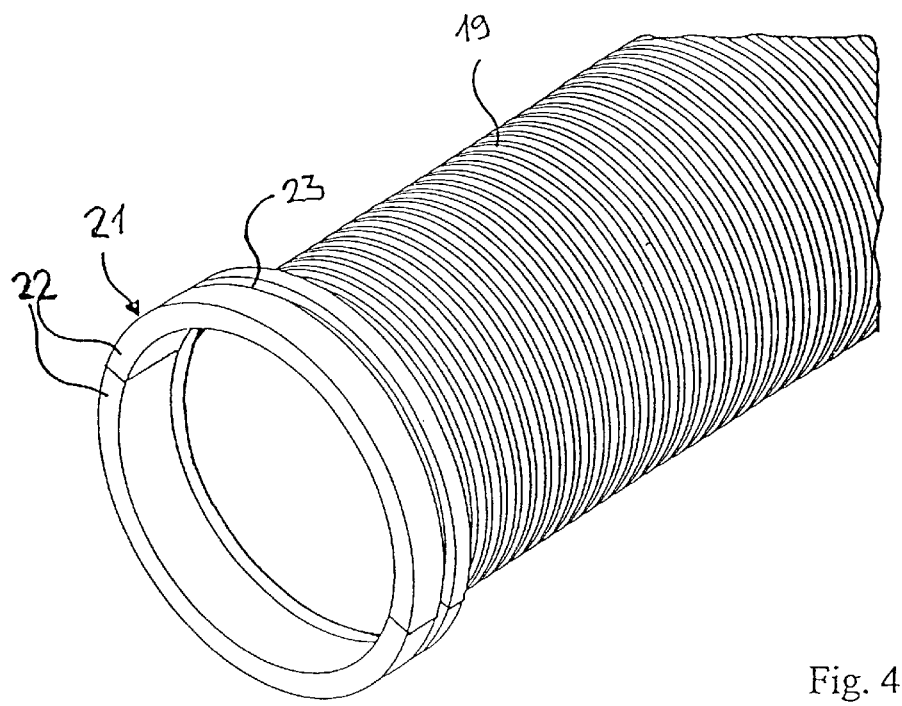
Figure 6:
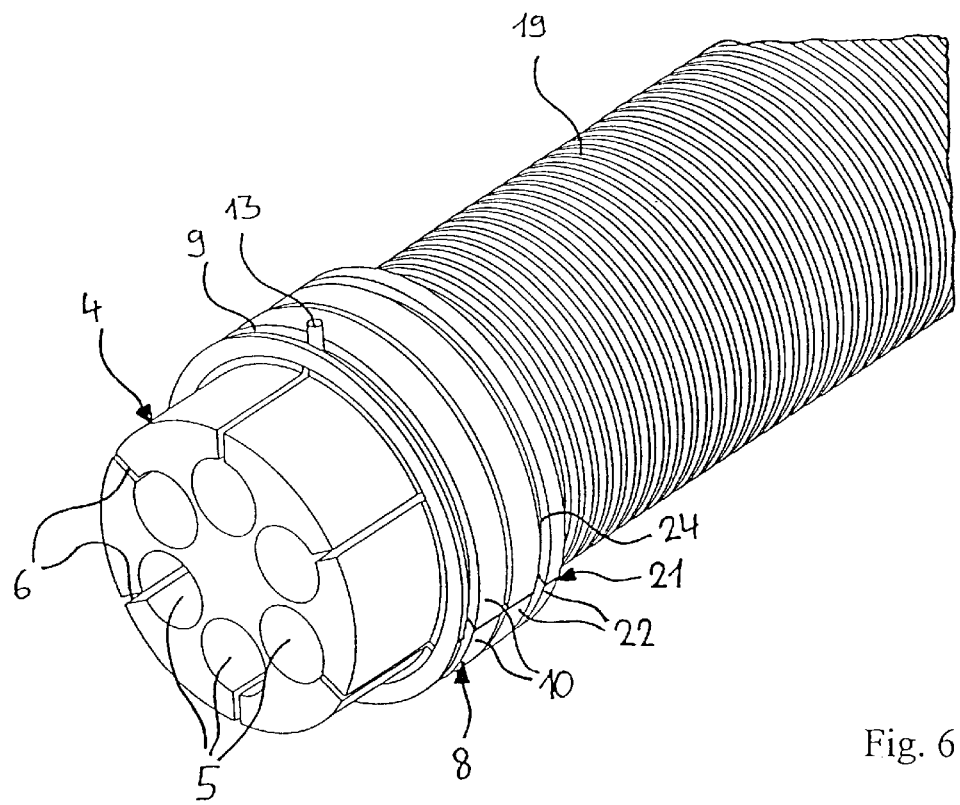
Figure 7:
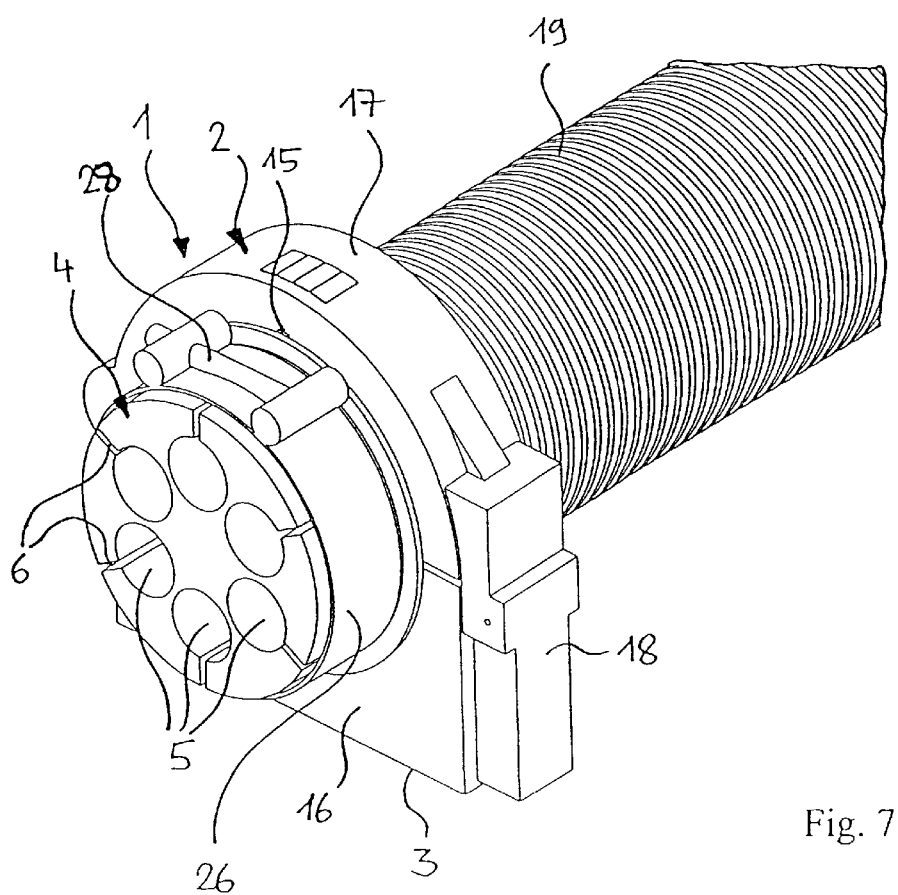

As can be gathered from FIG. 4, firstly the half-rings 22 of the holding part 21 for the cable guidance hose 19 are positioned above the holding structure 24 (FIGS. 2 and 3) located on the inside thereof on the circumference of the at least terminally corrugated cable guidance hose 19 and then the cable clamping piece 4 is positioned (FIG. 5). Then the half-rings 10 of the holding part 8 for the cable clamping piece 4 are located on the fixing structure 12 of the latter and at least one half-ring 13 is secured against twisting by means of the pin 13 radially traversing the same and engaging in the recess 14 in the fixing structure 12 of the clamping piece 4 (FIG. 6). Then the holding parts 8, 21 are placed above their external profiles 9, 23 in the clamping clip 2 and the latter is closed by means of the shackle 18 (FIG. 7), the pin 13 locking in the groove 15 positioned on the top 17 of the clip 2 in order to prevent twisting of the cable clamping piece 4. Finally the not shown cables secured in the reception channels 5 of the clamping piece 4 are secured by the tension clip 26 and a tightening screw 28 sets the desired clamping of the cables in the cable clamping piece 4.

The apparatus 1 shown in FIG. 8 comprises a clip 2 in the form of a tension clip, which can e.g. be fastened to the planar underside of a base 34 by means of a bore 55 in the vicinity of the hand of a robot 1a and is used for securing a cable guidance hose 19 for not shown cables used for supplying power to robot tools. The tension clip 2 also has a top 37 articulated to the base 34 and which can be braced by means of a shackle 40 (FIG. 9) to the base 34 and is pivotable about an axis 39 parallel to the median longitudinal axis 38 of the clip 2.

As can in particular be gathered from FIG. 10, the apparatus 1 has a holding part 41 which, in the embodiment shown, comprises a sleeve 42 with a spherical segment outer face 43 and a ring bearing 44 receiving the sleeve 42 with an inner face 45 complimentary to the outer face 43 of the sleeve 42, which is rotatable and pivotable relative to the ring bearing 44. On the side of the sleeve 42 facing the ring bearing 44 is provided on its spherical segment outer face 43 a circumferential widening 43a which, on pivoting the cable guidance hose 19, serves as a stop on the ring bearing 44 and secures the sleeve 42 against extraction from said ring bearing 44.

For the easy, rapid installation of the apparatus 1, the sleeve 42 has two half-shells 42a, 42b, whereof FIG. 10 only shows the half-shell 42a. On the inside of the half-shells, 42a, 42b of the sleeve 42 are provided shapes 46 in the form of inwardly projecting radial flanges for the axial, positive fixing on the circumference of the cable guidance hose 19, which in the represented construction is constructed terminally in cross-section in an e.g. trapezoidally corrugated manner, so that the shapes 46 engage in the corrugated structure of the guidance hose 19. In this way the hose 19 in the manner of a groove and tongue joint is held in axially fixed manner in the sleeve 42 and the shapes 46 form the tongues and the valleys of the hose 19 form the groove. On its connecting face to the half-shell 42b (not shown in FIG.

10), the half-shell 42a of the sleeve 42 has a centring pin 47, which can be introduced into a bore aligned therewith in the not shown half-shell 42b. The cable guidance hose 19 can obviously have over substantially its entire length a corrugated structure, e.g. a rectangular or trapezoidal corrugation in order to provide increased flexibility.

On its outside remote from the sleeve 42, the ring bearing 44 is equipped with a holding profile 48, which engages in a complimentary profile 50 on the inside of an adaptor ring 49. Whereas the holding profile 48 in the construction shown is e.g. constructed as an outwardly directed circumferential projection, the profile 50 of the adaptor ring 49 complimentary thereto is constructed as an inwardly open circumferential groove. For reasons of easy installation, the adaptor ring 49 once again comprises two half-rings 49a, 49b, only the half-ring 49a being shown in FIG. 10. On its outside remote from the bearing ring 44, the adaptor ring 49 is provided with a fixing profile 51, in order to fix it to the inner profile 52 of the clip 2 complimentary thereto and the fixing profile 51 of the adaptor ring 49 is e.g. constructed as an outwardly directed circumferential groove and the profile 52 of the clip 2 as an inwardly projecting circumferential projection. Thus, after closing the tension clip 2 by means of the shackle 40 (FIG. 9), the ring bearing 44 and adaptor ring 49 are held in non-rotary, axially fixed manner. On its side facing the ring bearing 44 the adaptor ring 49 has a larger diameter than on its side remote from the same, in order to give greater compactness to the apparatus 1 according to the invention. Alternatively the clip 2 could also act directly on the holding profile 48 of ring bearing 44.

On the side remote from the apparatus 1, the tension clip 2 has a further inner profile 53, which is in particular provided for the non-rotary, axially fixed securing of a not shown cable clamping piece and which is e.g. constructed as a polyhedral profile.

FIG. 11 is a perspective view of the apparatus 1 for illustrating the rotatability and pivotability of the cable guidance hose 19 relative to the median longitudinal axis 38 of the clip 2. Through the holding part 41 of the cable guidance hose 19 acting in the manner of a ball bearing said hose is on the one hand freely rotatable (arrow 54) and on the other is pivotable radially up to an angle a, the maximum pivoting angle a being reached when the circumferential widening 43a of the spherical segment outer face 43 of the sleeve 42 strikes against the ring bearing 44 of the holding part 41 (FIG. 10). The maximum pivoting angle a, as a function of the use of the cable guidance hose 19, is appropriately roughly between 20 and 30°. It can obviously be more than 30°, which can e.g. be achieved in simple manner by a sleeve with a surface portion longer in the axial direction than the sleeve 42 in FIG. 10 and in the manner of a spherical segment.

Hereinafter with reference to FIGS. 12 to 19 further details are given of the installation of the apparatus 1 according to the invention on the cable guidance or protective hose 19.

Figure 14:
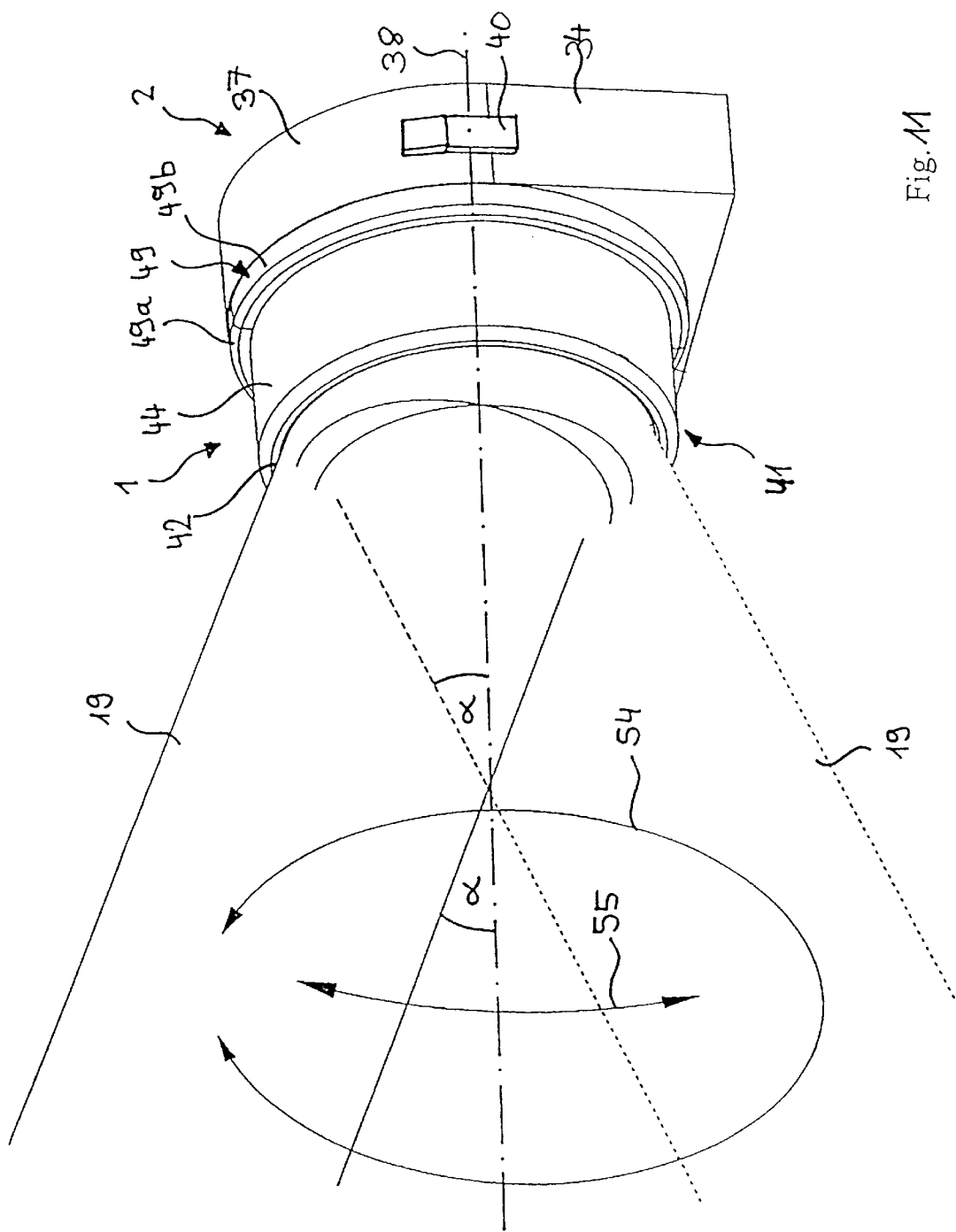
Figure 12:
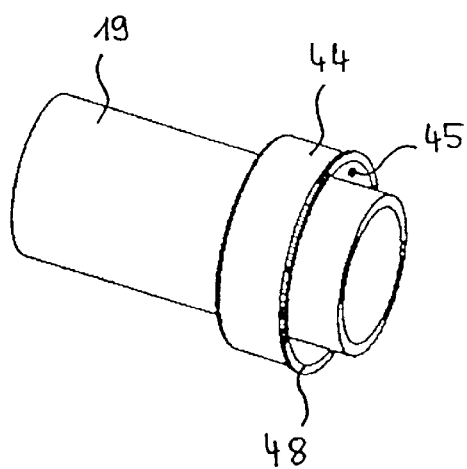
Figure 13:
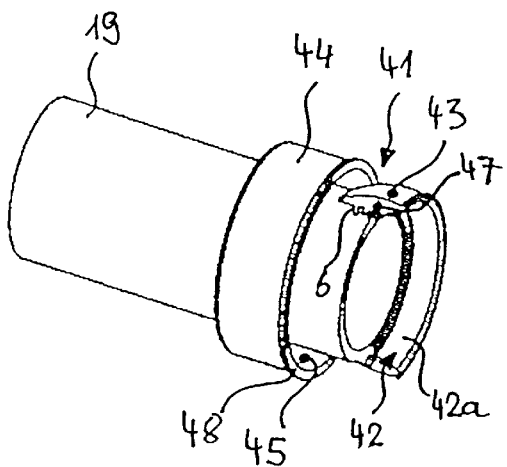
Figure 14:
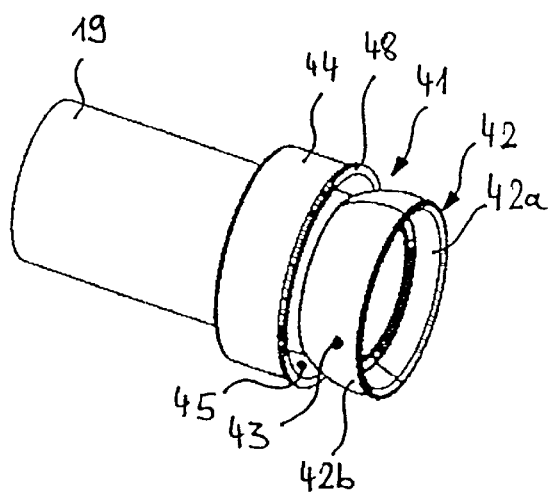
Figure 15:
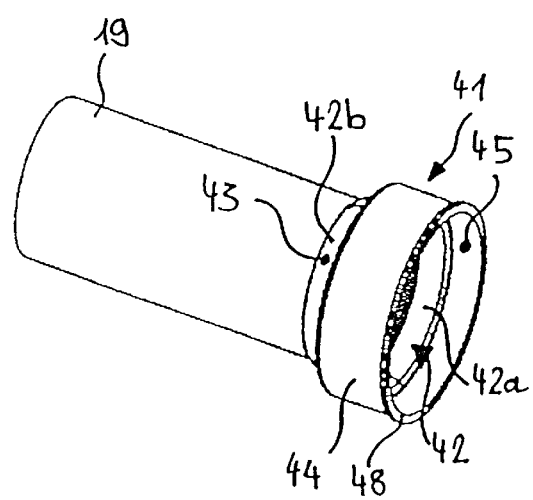
Figures 16, 17:
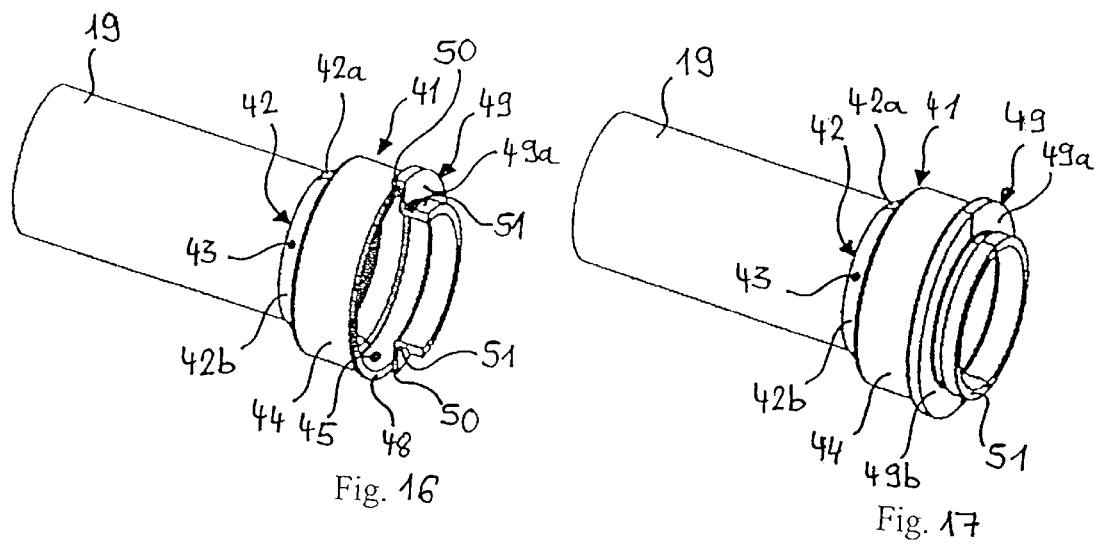
Figures 18, 19:
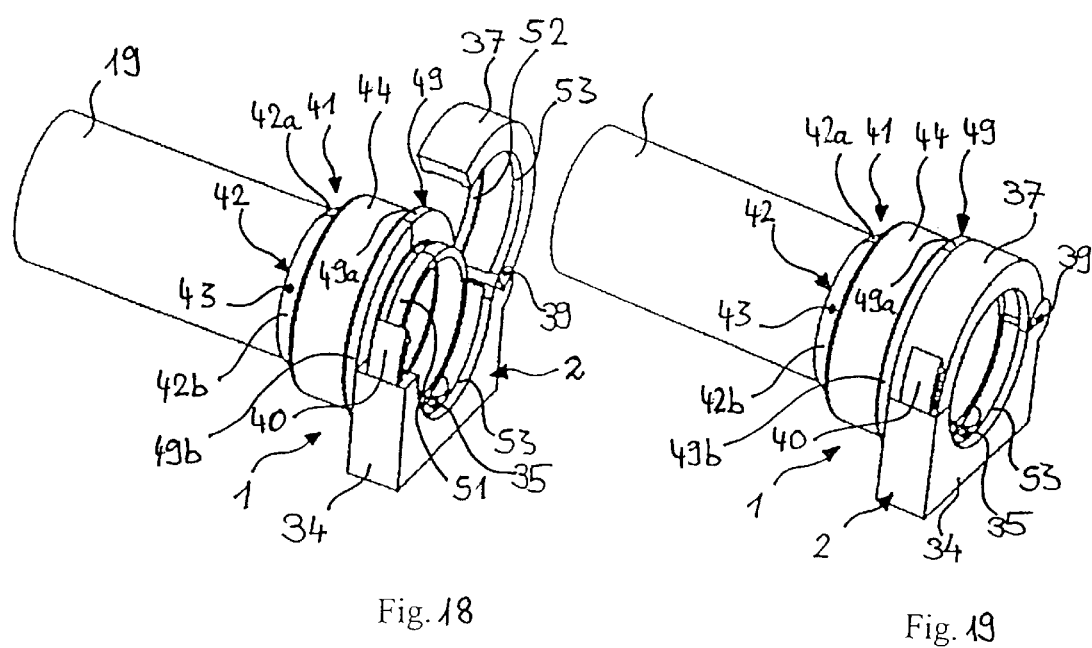

As can be seen in FIG. 12, firstly the ring bearing 44 is shoved over the end to be fixed of the cable guidance hose 19 and then the sleeve 22 is located at the end of said hose 19 (FIG. 13), in that successively the half-shells 42a, 42b are secured by means of their shapes 46 on the e.g. corrugated, not shown hose 19 and interconnected by means of the centring pins 47 (FIG. 14). The ring bearing 44 is then moved in the hose end direction over the sleeve 42 (FIG. 15), so that the spherical segment outer face 43 of the sleeve 42 comes to rest on the inner face 45 of the ring bearing 44 complimentary thereto. As can be gathered from FIGS. 16 and 17, the half-rings 49a, 49b of the adaptor ring 49 are then placed on the holding profile 48 of the ring bearing 44 and the profile 50 of the adaptor ring 49 engages on the holding profile 48 of the ring bearing 44. Finally the fixing profile 51 of the adaptor ring 49 is engaged on the profile 52, complimentary thereto, of the base 34 of the tension clip 2 (FIG. 18) and said clip 2 is closed, in that the top 37 is fixed by means of the shackle 40 to the base 34 (FIG. 19). Instead of this the half-rings 49a, 49b of the adaptor ring 48 can firstly be clipped into the base 34 and top 37 of the tension clip 2 and only then placed on the holding profile 48 of the ring bearing 44. The tension clip 2 is then closed by means of the shackle 40.

Prior to the fixing of the cable guidance hose 19, the base 34 of the tension clip 2 is placed on a machine, particularly a robot 1a, in that it is screwed by means of the bore 35 located on the underside of base 34 of clip 2. The inner profile 53 of the clip 2 remote from the cable guidance hose 19 is used for the joint fixing of a not shown cable clamping piece e.g. receiving supply cables and which is fixed in non-rotary, axially fixed manner to the profile 53.

What is claimed is:

1. An apparatus for fixing a cable guidance hose to a device, the apparatus comprising: a cable guidance hose held positively axially fixed on the device; a holding part connected to said cable guidance hose, the holding part being held axially fixed and ma non-rotary manner on the device the, said holding part individually holding cables extending out of the cable guidance hose; and a clamping clip, wherein the holding part is held in non-rotary manner by said clamping clip.

2. An apparatus according to claim 1, wherein the holding part receives a cable clamping piece non-positively holding the cables.

3. An apparatus according to claim 1, further comprising another holding part wherein said clamping clip has on the inside at least two holding profiles for the axial, positive fixing of said holding part for the cable guidance hose and said another holding pan for the cable clamping piece with profiles complimentary to the holding profiles of the clamping clip.

4. An apparatus according to claim 3, wherein the holding profiles of the clamping clip are spaced apart axially so as to ensure between the facing end faces of the cable guidance hose and the cable clamping piece an adequate gap.

5. An apparatus according to claim 3, wherein the holding pan for the cable guidance hose has two half-rings, which are equipped on their inside with a holding structure for the axial, positive fixing on the circumference of the cable guidance hose.

6. An apparatus according to claim 5, wherein, at least at the end, the cable guidance hose has a corrugation, particularly a rectangular or trapezoidal corrugation and the holding structure of the half-rings of the holding part for the cable guidance hose engage in the corrugated structure thereof.

7. An apparatus according to claim 3, wherein said clamping piece has a fixing structure and holding part for the cable clamping piece has two half-rings having an inside with a holding structure for the axial positive fixing to said fixing structure of said clamping piece, said fixing structure of said clamping piece being complementary to said inside with the holding structure.

8. An apparatus according to claim 7, further comprising a pin wherein at least one half-ring of the holding part for the cable clamping piece is fixable in non-rotary manner by means of said pin traversing it both to the cable clamping piece and to the clamping clip.

9. An apparatus according to claim 8, further comprising a groove is provided for receiving one end of the pin, said groove being provided on an end face of the clamping clip facing the cable clamping piece.

10. An apparatus according to claim 8, further comprising a recess on the circumference of the cable clamping piece, in the vicinity of the fixing structure, said recess for receiving one end of the pin.

11. An apparatus according to claim 1, wherein the cable clamping piece has a spigot engaging in the cable guidance hose.

12. An apparatus according to claim 1, wherein the cable clamping piece is constructed as a clamp with several axially positioned holding channels for the non-positive fixing of the cables.

13. An apparatus according to claim 12 wherein the cable clamping piece is made from an elastic material and the holding channels are connected by means of slots to the circumference of the clamping piece.

14. An apparatus according to claim 1, wherein said holding par has a sleeve with a spherical segment outer face, said sleeve being held on said clamping clip with respect to the median longitudinal axis of said clamping clip in both a rotary and pivotable manner thereon.

15. An apparatus according to claim 14, wherein the sleeve has two half-shells, which are equipped on their inside with shapes for the positive axial fixing to the circumference of the cable guidance hose.

16. An apparatus according to claim 15, wherein the cable guidance hose is provided with a corrugation at an end with an essentially rectangular or trapezoidal corrugation and the shapes of the halfshells of the sleeve engage in the corrugation of the guidance hose.

17. An apparatus according to claim 14, wherein the holding pan has a ring bearing receiving the sleeve with an inner face complimentary to the spherical segment outer face of the sleeve.

18. An apparatus according to claim 17, wherein on its side remote from the sleeve, the ring bearing is equipped with a holding profile for fixing to the clamping clip.

19. An apparatus according to claim 17, wherein the holding profile of the ring bearing can be fixed to a profile, complimentary thereto, of the clamping clip.

20. An apparatus according to claim 17, further comprising an adapter ring wherein the holding profile of the ring bearing can be fixed to a profile, complimentary thereto, of said adaptor ring and which is provided on its side remote from the ring bearing with a fixing profile for fixing on a profile of the clamping clip complimentary thereto.

21. An apparatus according to claim 20, wherein the adaptor ring has a larger diameter on a side remote from a side facing the ring bearing.

22. An apparatus according to claim 20, wherein the adaptor ring has two half-rings.

23. An apparatus according to claim 14, wherein a side of said clamping clip remote from the cable guidance hose can be secured in an axially fixed and non-rotary manner said clamping clip having a clamping piece for non-positively holding the cables.

24. An apparatus according to claim 14, further comprising a shackle wherein the clamping clip is a tension clip with a base fixable to the device and top braceable by means of said shackle and articulated to said shackle.

25. A robot comprising:

at least partly externally positioned cables;

a holding part held axially fixed to said robot;

a cable guidance hose connected to said holding part and held positively axially fixed on the robot by said holding part, said cables being guided and not held in said cable guidance hose and extending out of said cable guidance hose individually; and a clamping clip holding said holding part in a non-rotary manner relative to said robot, said holding part having a cable clamping piece non-positively holding the cables individually.

* * * * *